United States Patent
Köhler

(10) Patent No.: US 10,808,800 B2
(45) Date of Patent: Oct. 20, 2020

(54) CONNECTOR

(71) Applicant: BERLINER SEILFABRIK GMBH & CO., Berlin (DE)

(72) Inventor: Karl Heinz Köhler, Berlin (DE)

(73) Assignee: BERLINER SEILFABRIK GMBH & CO., Berlin (DE)

(*) Notice: Subject to any disclaimer, the term of this patent is extended or adjusted under 35 U.S.C. 154(b) by 407 days.

(21) Appl. No.: 15/757,940

(22) PCT Filed: Aug. 31, 2016

(86) PCT No.: PCT/EP2016/070495
§ 371 (c)(1),
(2) Date: Mar. 6, 2018

(87) PCT Pub. No.: WO2017/042071
PCT Pub. Date: Mar. 16, 2017

(65) Prior Publication Data
US 2018/0340591 A1    Nov. 29, 2018

(30) Foreign Application Priority Data
Sep. 11, 2015 (DE) .......... 10 2015 115 388

(51) Int. Cl.
*F16G 11/04* (2006.01)
*A63B 9/00* (2006.01)
*F16M 13/02* (2006.01)

(52) U.S. Cl.
CPC .............. *F16G 11/048* (2013.01); *A63B 9/00* (2013.01); *F16M 13/02* (2013.01);
(Continued)

(58) Field of Classification Search
CPC .......... F16G 11/048; A63B 9/00; F16M 13/02
See application file for complete search history.

(56) References Cited

U.S. PATENT DOCUMENTS

2009/0301823 A1* 12/2009 Lin .................. E05B 53/003
188/65.1

FOREIGN PATENT DOCUMENTS

DE           701532 A     1/1941
DE         1961357 U     6/1967
(Continued)

OTHER PUBLICATIONS

Machine English Translation of DE701532, listed above (2 pages).
(Continued)

*Primary Examiner* — Daniel J Wiley
(74) *Attorney, Agent, or Firm* — Lewis Roca Rothgerber Christie LLP

(57) ABSTRACT

The invention relates to a connector (10) for securing a rope (12) to a support structure (54), comprising a sleeve (16) which can be interlockingly and/or frictionally or integrally connected to a support structure element (56), and which has an inner casing surface (18) having at least one region (20) with an inner thread (22) and having at least one further region (24) for guiding a rope, as well as comprising a screw-in sleeve (32) which has an outer thread (34) at least in sections for screwing into the sleeve, and which also has an inner casing surface (36) for guiding a rope. An inner diameter (26) of the region (20) is larger than a further inner diameter (28) of the further region, and the regions are separated from one another at least in sections by a chamfer (30), such that at least one ball element (40) can be positioned between the chamfer, the screw-in sleeve and a rope that can be guided by the sleeve and the screw-in sleeve, and the guidable rope can be secured by means of traction by screwing the screw-in sleeve into the sleeve.

20 Claims, 3 Drawing Sheets

Figure 2A:
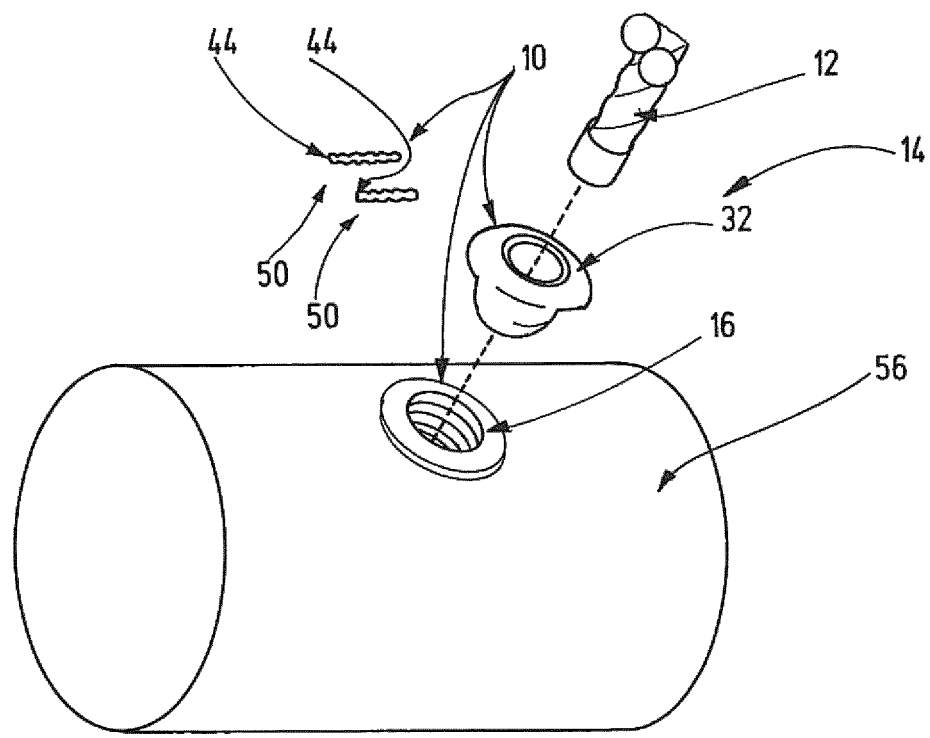

(52) U.S. Cl.
CPC ... *A63B 2009/002* (2013.01); *A63B 2009/006* (2013.01); *A63B 2208/12* (2013.01)

(56) References Cited

FOREIGN PATENT DOCUMENTS

| | | |
|---|---|---|
| DE | 20310624 U1 | 12/2004 |
| EP | 1421977 A1 | 5/2004 |
| FR | 2866533 A1 | 8/2005 |
| GB | 276525 A | 9/1927 |
| GB | 960436 A | 6/1964 |

OTHER PUBLICATIONS

Machine English Translation of DE1961357, listed above (2 pages).
Machine English Translation of DE20310624, listed above (13 pages).
Machine English Translation of FR2866533, listed above (4 pages).

\* cited by examiner

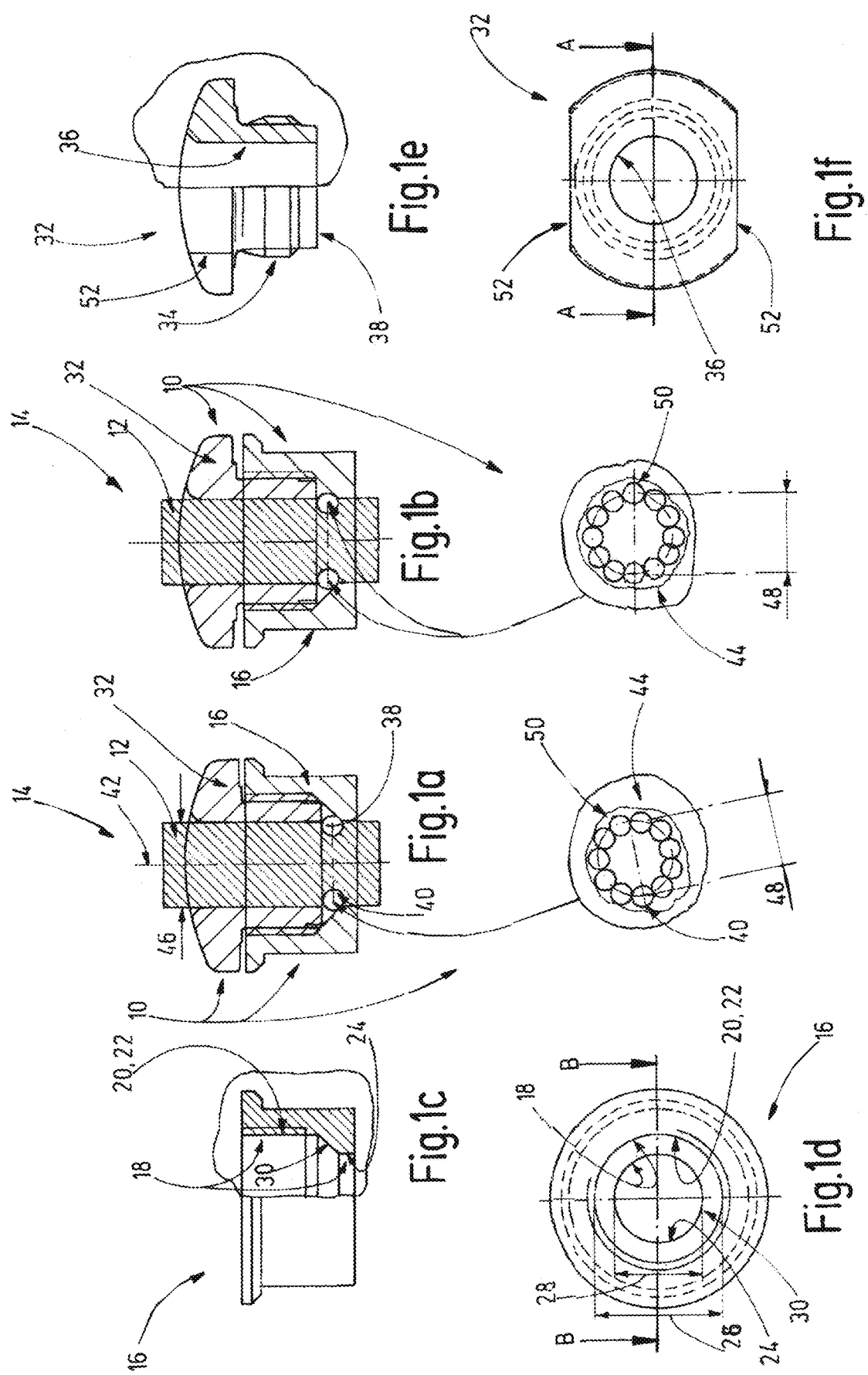

CONNECTOR

CROSS-REFERENCE TO RELATED APPLICATION(S)

This application is a National Phase Patent Application of International Patent Application Number PCT/EP2016/070495, filed on Aug. 31, 2016, which claims priority of German Patent Application 10 2015 115 388.2, filed Sep. 11, 2015. The entire contents of both of which are incorporated herein by reference.

The invention relates to a connector for securing a rope to a support structure, a connection system comprising the connector and a support structure comprising the connection system.

Support structures consisting of mechanical structural elements and ropes tensioned between them are known in principle. Such support structures are used inter alia in the field of leisure facilities, purely by way of example in climbing facilities in children's playgrounds. Further possible fields of use are, likewise purely by way of example, sports facilities, artworks or other fields in which reliable, flexible, load-bearing support structures that can be produced with little effort are required.

With such support structures it can be a challenge to fit them at their intended sites. Often such support structures have complex shapes or are intended for erection at locations which are difficult to access. When connecting the rope to the structural elements, in particular, one difficulty is that the rope has conventionally to be guided through the structural elements and screwed to the back thereof.

It is thus the object of the present invention to provide a connector for securing a rope to a support structure which can be simply and reliably fitted and can additionally be produced with little effort.

The subject matter of the present invention relates to a connector for securing a rope to a support structure, comprising a sleeve which can be interlockingly and/or frictionally connected or integrally connected to a support structure element and which has an inner casing surface having at least one region with an inner thread and having at least one further region for guiding a rope, and further comprising a screw-in sleeve which has an outer thread over at least a portion thereof for screwing into the sleeve and which additionally has an inner casing surface for guiding a rope. According to the invention, an inner diameter of the region is greater than a further inner diameter of the further region and the regions are separated from one another at least in sections by a chamfer, such that at least one ball element can be positioned between the chamfer, the screw-in sleeve and a rope guidable by the sleeve and the screw-in sleeve and the guidable rope can be secured by means of traction by screwing the screw-in sleeve into the sleeve.

This offers the advantage of ensuring simple and reliable fitting even when the fitting location is only accessible from one side. Advantageously, a rope can be fitted on a support structure element using the connector according to the invention, wherein the support structure element has merely to be accessible from one side. In addition, the connector according to the invention is very robust and has a high loading capacity, is of simple construction and can be produced with little effort. It is also advantageous that a free rope length can be flexibly adjusted with the connector. Moreover, the connector allows easy maintenance and can be removed again with little effort.

A preferred configuration of the present invention provides that a plurality of ball elements can be positioned between the chamfer, the screw-in sleeve and the guidable rope.

This offers the advantage on the one hand of enabling more reliable securing. It is also advantageous that the rope can be guided and secured substantially concentrically relative to the inner casing surfaces of the sleeve and the screw-in sleeve.

A further preferred configuration of the present invention provides that the chamfer for dividing the regions is rotationally symmetrical.

This offers the advantage of reducing manufacturing effort. This offers the further advantage that the ball elements have a larger contact surface and are thus easier to fit.

A further preferred configuration of the present invention provides that a ratio between a minimum ring diameter which can be formed by the ball elements and a diameter of the guidable rope is 0.6 to 0.9.

A person skilled in the relevant art will be readily aware that, to realize this preferred embodiment of the invention, any desired rope diameter and ball element diameter can be selected which lead, in conjunction with a corresponding design of the sleeve and the screw-in sleeve, to the stated ratio when the screw-in sleeve is screwed into the sleeve, with the ball elements arranged in the region of the chamfer of the sleeve and a rope guided by the sleeve and the screw-in sleeve. The connector is thus advantageously scalable as desired. In principle, scaling can proceed as desired, providing the rope is still reliably secured by means of traction with regard to the stresses to be expected when in use.

Experimental investigations have shown that a particularly reliable and durable connection can be achieved if the ratio lies in this range. The ratio is particularly preferably 0.65 to 0.8 and very particularly preferably 0.68 to 0.76.

A further preferred configuration of the present invention provides that the ball element or the ball elements are arranged in or on a single- or multi-part supporting part which at least in part exhibits shape-resilient properties. Purely by way of example, the supporting part can be a shrink tube.

This offers the advantage of significantly simplifying fitting. If the supporting part is for example a single part, fitting is simplified further. If it is multi-part for example, the ball elements are easier to move into their final position, in which the rope is clamped. In particular in difficult installation positions or indeed in the case of connections fitted overhead, fitting is characterized by involving very little effort. Furthermore, the quality of the connector is also increased significantly, since the ball elements are picked in preparation for fitting, and can also be colour coded, so reducing the impact of errors. Such a supporting part can also be used as corrosion protection. In this way, not only is quality further increased but in particular also connector reliability.

A further preferred configuration of the present invention provides that 11 to 12 ball elements with a diameter of 4.5 mm are provided for a guidable rope with a diameter of 18 mm.

Experimental investigations have shown that in this case, particularly advantageous conditions for a connection which is easy to fit, highly durable and capable of carrying a heavy load are achieved for ropes conventionally used in the field of climbing facilities for children's playgrounds and similar fields of use.

A further preferred configuration of the present invention provides that the screw-in sleeve comprises contact surfaces for a screwing-in tool.

This offers the advantage that the connector is particularly easy, reliable and quick to fit.

A further aspect of the present invention relates to a connection system comprising at least one connector according to the invention for securing a rope to a support structure and at least one rope guidable by a sleeve and a screw-in sleeve of the connector.

This offers the advantage that the connection system is very reliable and robust and capable of bearing a heavy load, is flexible and of a simple structure, can be produced, fitted and removed with little effort and allows easy maintenance.

A further aspect of the present invention relates to a support structure comprising at least one connection system according to the invention and at least one support structure element.

This offers the advantage that the support structure is very reliable and robust and capable of bearing a heavy load, is flexible and of a simple structure, can be produced, fitted and removed with little effort and allows easy maintenance.

A preferred configuration of the present invention provides that the support structure comprises one or more additional tensioning elements for ropes for producing a screw-like connection.

In this way, quality and reliability are improved and fitting is further simplified.

Further preferred configurations of the invention are revealed by the remaining features mentioned in the subclaims.

The various embodiments of the invention mentioned in this application can advantageously be combined together, provided it is not stated otherwise with regard to an individual case.

Figure 2D:
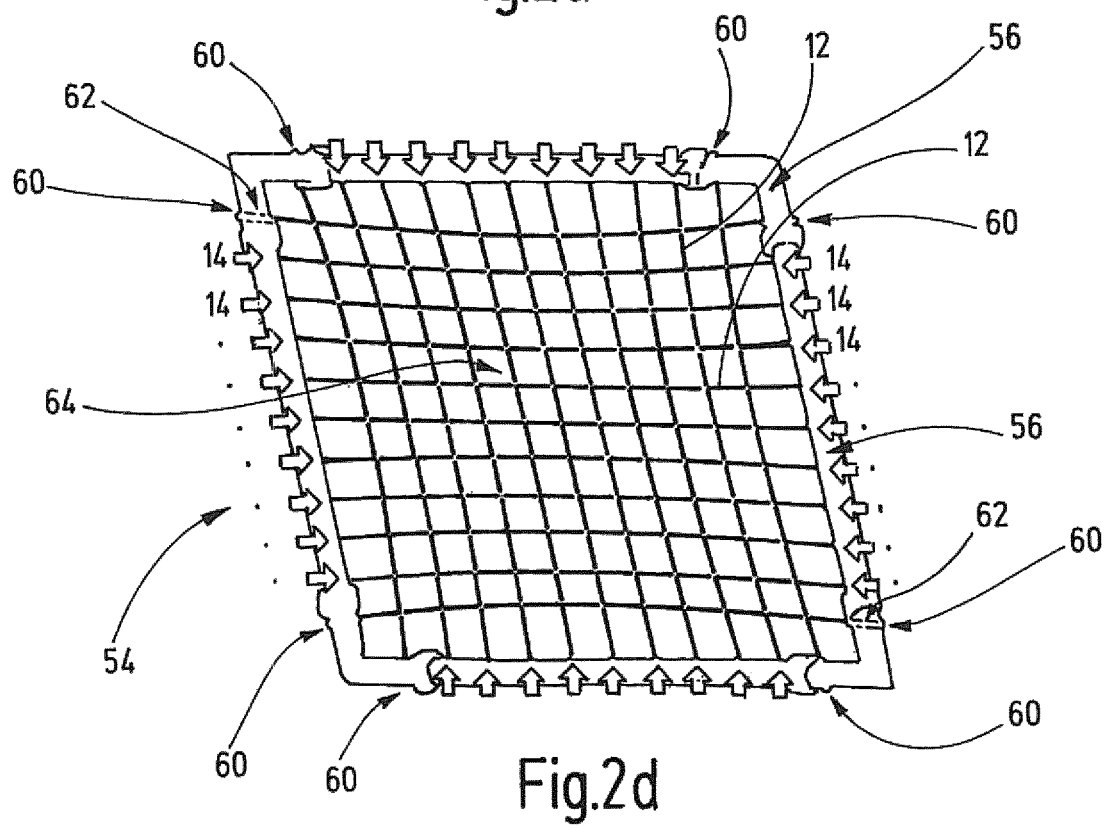
Figure 2B:
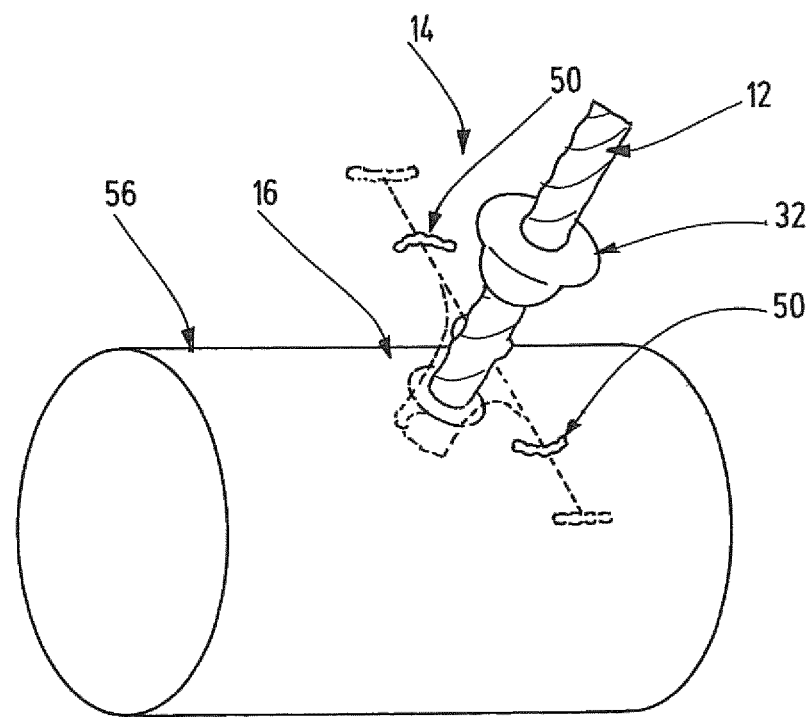
Figure 2C:
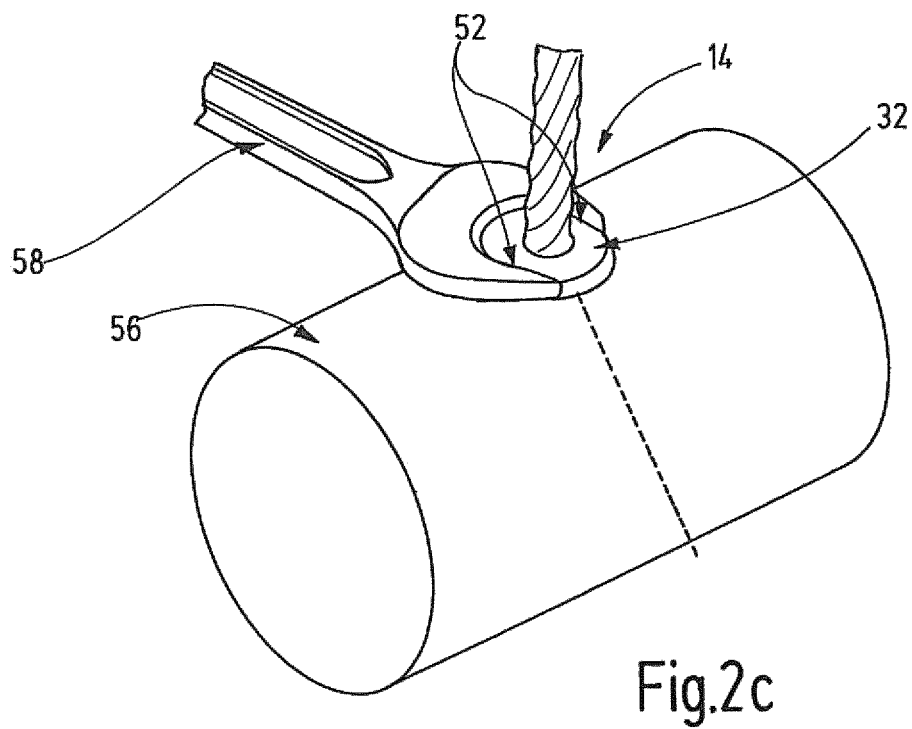

The invention is explained below with reference to exemplary embodiments and on the basis of the accompanying drawings, in which:

FIG. 1 is a schematic representation of a preferred embodiment of a connector according to the invention for securing a rope to a support structure in a connection system according to the invention; and FIG. 2 is a schematic representation of a preferred embodiment of a support structure according to the invention.

FIG. 1 shows a schematic representation of a preferred embodiment of a connector 10 according to the invention for securing a rope 12 merely indicated here to a support structure not shown here in a connection system 14 according to the invention. Without the merely indicated rope 12 what is shown in FIG. 1 corresponds to the connector 10 according to the invention, while with the rope 12 it corresponds to the connection system 14 according to the invention. The connector 10 comprises, as shown in FIGS. 1A and 1B, a sleeve 16 which, in this exemplary embodiment, can be integrally connected to a support structure element not shown here. The sleeve 16 is produced as a turned part from a weldable material, preferably steel or special steel. FIGS. 1A and 1B show cross-sectional views, the section lines of which are visible in FIGS. 1D and 1F. FIGS. 1A and 1B show substantially the same components, such that the reference signs are not shown throughout. The sleeve 16 is shown in FIG. 1C in side view with a broken-away portion and in FIG. 1D in unsectioned plan view. The sleeve 16 has an inner casing surface 18. The inner casing surface 18 has a region 20 with an inner thread 22. On its inner casing surface 18 the sleeve 16 has a further region 24 for guiding a rope 12. An inner diameter 26 of the region 20 is greater than a further inner diameter 28 of the further region 24. The regions 20, 24 are separated from one another by a chamfer 30. Furthermore, the connector 10 comprises a screw-in sleeve 32. The screw-in sleeve 32 is shown in FIG. 1E in side view with a broken-away portion and in FIG. 1F in unsectioned plan view. The screw-in sleeve 32 is preferably likewise produced from steel or special steel as a turned part. The screw-in sleeve 32 and the sleeve 16 are preferably made from a non-corroding material and a material combination which does not corrode on interaction. The screw-in sleeve 32 comprises over a portion thereof an outer thread 34 for screwing into the inner thread 22 of the sleeve 16. The screw-in sleeve 32 additionally comprises an inner casing surface 36 against which a rope 12 can be guided. A least one ball element 40 can be positioned between the chamfer 30, a pressure face 38 of the screw-in sleeve 32 and a rope 12 guidable by the sleeve 16 and the screw-in sleeve 32. By screwing the screw-in sleeve 32 into the sleeve 16, the guidable rope 12 can be secured along its longitudinal axis 42 with local deformation of said rope 12 and the involvement of a frictional connection. In this exemplary embodiment, a plurality of ball elements 44 can be positioned between the chamfer 30 and the screw-in sleeve 32 and the guidable rope 12. To this end, the chamfer 30 for dividing the regions 20, 24 is rotationally symmetrical. In this exemplary embodiment, the connector 10 is designed for a guidable rope 12 with a diameter 46 of 18 mm. To this end, 11 or 12 ball elements 44 are preferably provided. In this exemplary embodiment, the ball elements 44 each have a diameter of 4.5 mm. FIG. 1A shows a variant with 11 ball elements 44 and FIG. 1B shows a variant with 12 ball elements 44 of the connector 10 according to the invention. Together with the rope 12, this forms the connection system 14 according to the invention. A ratio between a minimum ring diameter 48 which can be formed by the ball elements 44 and the diameter 46 of the rope 12 is thus in a range from 0.6 to 0.9. The ball elements 44 are arranged in a supporting part 50 which in part exhibits shape-resilient properties. The supporting part 50 can for example be a tube, for example a shrink tube, of a plastics material. In the present exemplary embodiment, the supporting part 50 is in two parts. Furthermore, the screw-in sleeve 32 comprises contact surfaces 52 for a screwing-in tool not shown here.

FIG. 2 shows a schematic representation of a preferred embodiment of a support structure 54 according to the invention. Where reference signs are used which are identical to those of FIG. 1, these describe the same features and apply at least additionally also to FIG. 2. The support structure 54 comprises a plurality of connection systems 14 according to the invention and a plurality of support structure elements 56. FIGS. 2A, 2B and 2C show by way of example, on the basis of a support structure element 56 of which a portion is illustrated and one of the connection systems 14, how a rope 12 can be secured therewith to the support structure element 56 by way of a connector 10. First of all, FIG. 2A shows the initial situation, in which a sleeve 16 is integrally connected to the support structure element 56. The screw-in sleeve 32 and the ball elements 44, which in this exemplary embodiment are arranged in two separate supporting parts 50 to simplify fitting, and the rope 12 have here not as yet been fitted. FIG. 2B further shows how the rope 12 is guided by the screw-in sleeve 32 and the sleeve 16 against the inner casing surfaces 18, 36 thereof. The ball elements 44 in the supporting parts 50 are positioned in the sleeve 16 in the region of a chamfer 30, before the screw-in sleeve 32 is screwed into the sleeve 16. The screwing-in operation is shown in FIG. 2C. In this operation a screwing-in tool 58 is used, which can be applied against the contact surfaces 52 of the screw-in sleeve 32. The screw-in sleeve 32 is preferably screwed into the sleeve 16 until the ball elements 44 form a minimum possible ring diameter 48. In this state a residual gap is preferably present between the screw-in sleeve 32 and the sleeve 16 of between 1 mm and 2 mm. Finally, FIG. 2D shows the support structure 54 with a plurality of ropes 12, which are connected with different support structure elements 56 via in each case two connection systems 14. The support structure 54 comprises additional tensioning elements 60 for some of the ropes 12 to produce a screw-like connection 62. These serve in tensioning a net 64 formed by the ropes 12. The support structure 54 can in particular be further configured to construct a climbing structure in the field of children's playgrounds.

List of Reference Numerals

10 Connector
12 Rope
14 Connection system
16 Sleeve
18 Inner casing surface
20 Region
22 Inner thread
24 Region
26 Inner diameter
28 Inner diameter
30 Chamfer
32 Screw-in sleeve
34 Outer thread
36 Inner casing surface
38 Pressure face
40 Ball element
42 Longitudinal axis
44 Ball element
46 Diameter
48 Ring diameter
50 Supporting part
52 Contact surface
54 Support structure
56 Support structure element
58 Screwing-in tool
60 Tensioning element
62 Connection
64 Net

The invention claimed is:

1. A connector for securing a rope to a support structure, comprising:
   a sleeve which can be interlockingly and/or frictionally connected or integrally connected to a support structure element, the sleeve comprising:
      an inner casing surface having at least one first region with an inner thread, and
      at least one second region spaced from the first region along a longitudinal axis, and
   a screw-in sleeve comprising:
      an outer thread over at least a portion thereof for screwing into the inner thread of the sleeve,
      an inner casing surface for guiding the rope, and
      a pressure face transverse to the longitudinal axis,
   wherein an inner diameter of the first region is greater than an inner diameter of the second region, the inner diameter of the second region is substantially the same as a diameter of the rope, and the first and second regions are separated from one another at least in sections by a chamfer, such that at least one ball element is positioned between the chamfer, the pressure face, and the rope, whereby the rope can be secured by screwing the screw-in sleeve into the sleeve.

2. The connector according to claim 1, characterized in that a plurality of ball elements can be positioned between the chamfer, the screw-in sleeve and the rope.

3. The connector according to claim 1, characterized in that the chamfer for separating the regions is rotationally symmetrical.

4. The connector according to claim 1, characterized in that a ratio between a minimum ring diameter formed by the ball elements and a diameter of the rope is 0.6 to 0.9.

5. The connector according to claim 1, characterized in that the at least one ball element is arranged in or on a single- or multi-part supporting part which at least in part exhibits shape-resilient properties.

6. The connector according to claim 1, characterized in that 11 to 12 ball elements with a diameter of 4.5 mm are provided for a rope with a diameter of 18 mm.

7. The connector according to claim 1, characterized in that the screw-in sleeve has contact surfaces for a screwing-in tool.

8. A connection system comprising at least one connector for securing a rope to a support structure according to claim 1, and at least one rope guidable by a sleeve and a screw-in sleeve of the connector.

9. A support structure comprising at least one connection system according to claim 8 and at least one support structure element.

10. The support structure according to claim 9, characterized in that the support structure comprises one or more additional tensioning elements for ropes for producing a screw-like connection.

11. A connector for securing a rope to a support structure, comprising:
   a sleeve which can be interlockingly and/or frictionally connected or integrally connected to a support structure element, the sleeve comprising:
      an inner casing surface having at least one first region with an inner thread, and
      at least one second region spaced from the first region along a longitudinal axis, and
   a screw-in sleeve comprising:
      an outer thread over at least a portion thereof for screwing into the inner thread of the sleeve,
      an inner casing surface for guiding the rope, and
      a pressure face transverse to the longitudinal axis, wherein the pressure face is at a longitudinal end of the screw-in sleeve,
   wherein an inner diameter of the first region is greater than an inner diameter of the second region, and the first and second regions are separated from one another at least in sections by a chamfer, such that at least one ball element is positioned between the chamfer, the pressure face, and the rope, whereby the rope can be secured by screwing the screw-in sleeve into the sleeve.

12. The connector according to claim 11, characterized in that a plurality of ball elements can be positioned between the chamfer, the screw-in sleeve and the rope.

13. The connector according to claim 11, characterized in that the chamfer for separating the regions is rotationally symmetrical.

14. The connector according to claim 11, characterized in that a ratio between a minimum ring diameter formed by the ball elements and a diameter of the rope is 0.6 to 0.9.

15. The connector according to claim 11, characterized in that the at least one ball element is arranged in or on a single- or multi-part supporting part which at least in part exhibits shape-resilient properties.

16. The connector according to claim 11, characterized in that 11 to 12 ball elements with a diameter of 4.5 mm are provided for a guidable rope with a diameter of 18 mm.

17. The connector according to claim 11, characterized in that the screw-in sleeve has contact surfaces for a screwing-in tool.

18. A connection system comprising at least one connector for securing a rope to a support structure according to claim 11, and at least one rope guidable by a sleeve and a screw-in sleeve of the connector.

19. A support structure comprising at least one connection system according to claim 18 and at least one support structure element.

20. The support structure according to claim 19, characterized in that the support structure comprises one or more additional tensioning elements for ropes for producing a screw-like connection.

* * * * *